US007070552B2

(12) United States Patent
Mizumoto

(10) Patent No.: US 7,070,552 B2
(45) Date of Patent: Jul. 4, 2006

(54) ELECTROCONDUCTIVE RUBBER ROLLER

(75) Inventor: Yoshihisa Mizumoto, Hyogo (JP)

(73) Assignee: Sumitomo Rubber Industries, Ltd., Hyogo (JP)

( * ) Notice: Subject to any disclaimer, the term of this patent is extended or adjusted under 35 U.S.C. 154(b) by 70 days.

(21) Appl. No.: 10/716,608

(22) Filed: Nov. 20, 2003

(65) Prior Publication Data

US 2004/0110617 A1 Jun. 10, 2004

(30) Foreign Application Priority Data

Nov. 22, 2002 (JP) ............................ 2002-338968

(51) Int. Cl.
*B25F 5/02* (2006.01)
*F16C 13/00* (2006.01)

(52) U.S. Cl. ............................ 492/56; 492/25; 492/53; 492/56; 492/59; 399/279; 399/281

(58) Field of Classification Search .................. 492/53, 492/56, 59, 25; 399/279, 281
See application file for complete search history.

(56) References Cited

U.S. PATENT DOCUMENTS

| | | | | |
|---|---|---|---|---|
| 4,557,306 | A * | 12/1985 | Graves | 152/548 |
| 6,480,692 | B1 * | 11/2002 | Yamazaki et al. | 399/281 |
| 6,620,875 | B1 * | 9/2003 | Hong et al. | 524/492 |
| 6,648,807 | B1 * | 11/2003 | Hashimoto et al. | 492/59 |
| 6,653,038 | B1 * | 11/2003 | Matsunaga et al. | 430/108.22 |

FOREIGN PATENT DOCUMENTS

| | | |
|---|---|---|
| JP | 2001-357735 A | 12/2001 |
| JP | 2002-194203 A | 10/2002 |

* cited by examiner

*Primary Examiner*—Derris H. Banks
*Assistant Examiner*—Hung C. Le
(74) *Attorney, Agent, or Firm*—Birch, Stewart, Kolasch & Birch, LLP

(57) ABSTRACT

An electroconductive rubber roller (10) whose outermost layer consists of a rubber layer (1) made of a rubber composition containing an ionic-conductive rubber as a main component thereof. The surface of the rubber layer consists of an oxide film; and the rubber composition contains a dielectric loss tangent-adjusting filler to set a dielectric loss tangent of the electroconductive rubber roller to 0.1 to 1.5. Weak electroconductive carbon black and/or calcium carbonate treated with fatty acid can be used as the dielectric loss tangent-adjusting filler.

17 Claims, 3 Drawing Sheets

ELECTROCONDUCTIVE RUBBER ROLLER

This nonprovisional application claims priority under 35 U.S.C. § 119(a) on Patent Application No. 2002-338968 filed in JAPAN on Nov. 22, 2002, the entire contents of which are hereby incorporated by reference.

BACKGROUND OF THE INVENTION

1. Field of the Invention

The present invention relates to an electroconductive rubber roller. More particularly, the present invention relates to the electroconductive rubber roller that is used preferably as a development roller provided in an image-forming mechanism of a laser printer and the like to make toner adhere to a photosensitive member. The development roller is superior in its toner-transporting performance and in charging the toner.

2. Description of the Related Art

In recent years, electrophotographic apparatuses such as a laser printer form images having a high quality at a high speed. In the laser printer, a photosensitive member directly connected to image formation and members disposed in the vicinity thereof are demanded to have high accuracy and a high speed (high response) in an initial process in an image-forming operation. Accordingly it is essential for the development roller to have high electrostatic property because the development roller used in the image-forming mechanism of the laser printer receives charged toner uniformly and supply the received toner uniformly to an electrostatic latent image formed on the photosensitive member.

The development roller having the above-described role is conventionally is of a magnet type. But with increased adoption of a system in which spherical single-component toner whose diameter can be reduced and carrier particles are not used, the development roller is increasingly made of a semi-electroconductive elastic material such as rubber instead of a magnet type as the present tendency.

The development roller is demanded to transport the toner to the photosensitive member favorably and charge the toner favorably. It is known that the toner-transporting performance of the development roller depends on the electric charge of the toner and the power of static electricity that is determined by a developing electric field. The developing electric field is determined by the kind of a developing electrode and the positional relationship between the development roller to which a bias voltage is applied and the photosensitive member on which an electrostatic latent image is formed, namely, the electric potential thereof.

In a system in which two-component toner and a carrier are used, the toner can be transported easily owing to electric and magnetic actions. The development roller used in the system employing the single-component toner is incapable of displaying a magnetic force. Thus in the system employing the single-component toner, the development roller is demanded to have a uniform surface which constitutes the end surface of the electrode. That is, the surface of the development roller is required to have a high degree of accuracy. When the bias potential is applied to the development roller, a very uniform distribution of the electric potential is required so that the electrical characteristics of the development roller such as the electric resistance is very uniform.

Because the carrier is not used in the system employing the single-component toner, the development roller is demanded to have the function of controlling the electrostatic property of the toner. When the charged quantity of the toner is insufficient, the toner cannot be transported faithfully to the electrostatic latent image on the photosensitive member owing to shortage of the power of static electricity. Consequently defective images are formed. For example, a concentration change, a ghost image, and fog are generated owing to the rotation of the development roller. Various proposals are made to solve the problems.

For example, the rubber material is disclosed in Japanese Patent Application Laid-Open No. 2002-194203 to provide the rubber layer of the development roller with a uniform electric resistance. In this proposal, the rubber material contains not an electroconductive filler but calcium carbonate, whose particles have the specified diameter, dispersed in ionic-conductive epichlorohidrin rubber to control the electric resistance of the rubber layer of the development roller by ionic conduction.

In the disclosure made in Japanese Patent Application Laid-Open No. 2001-357735, the surface of the electroconductive member is treated with a treating agent having an amine compound to control the electrostatic property of toner.

Although the rubber material disclosed in Japanese Patent Application Laid-Open No. 2002-194203 makes the electric resistance of the rubber layer uniform to some extent, the rubber material is incapable of providing toner with favorable electrostatic property nor allowing the toner to have the charged electrostatic property for a long time. Therefore the development roller made of the rubber material does not provide a preferable printed image.

According to the disclosure made in Japanese Patent Application Laid-Open No. 2001-357735, the surface of the electroconductive member of the development roller or the like cannot be treated very accurately with the treating agent. Thus the rubber material is incapable of allowing the formation of a high-quality image. Since the material of the development roller is different from that of the coating agent, there is a possibility that the coating agent peels off from the material of the development roller during production and the use thereof. It is difficult to control both the toner-transporting performance and the electrostatic property of the toner.

SUMMARY OF THE INVENTION

The present invention has been made in view of the above-described problems. Therefore it is an object of the present invention to provide an electroconductive rubber roller which can be made uniform in its electric resistance and is capable of charging toner favorably and keeping the charged electrostatic property thereof for a long time. The present invention is particularly intended to provide an electroconductive rubber roller which can be suitably used as a development roller which is used for single-component toner.

To achieve the object, the present invention provides an electroconductive rubber roller whose outermost layer consists of a rubber layer made of a rubber composition containing an ionic-conductive rubber as a main component thereof.

In this construction, a surface of the rubber layer consists of an oxided film; and the rubber composition contains a dielectric loss tangent-adjusting filler to set a dielectric loss tangent of the electroconductive rubber roller to 0.1 to 1.5.

The present inventors have found that the dielectric loss tangent gives a great influence on the charging characteristic of the electroconductive rubber roller such as a development roller which performs the function of making toner adhere to a photosensitive member. The present inventors have also found that it is possible to make the electric resistance of the electroconductive rubber roller made of the ionic-conductive rubber uniform and control the electrostatic property of the toner by reducing the dielectric loss tangent of the electroconductive rubber roller to the above-described range. Thereby the electroconductive rubber roller is allowed to show preferable charging characteristic. Thus when the electroconductive rubber roller is used as the development roller, the development roller is capable of keeping the charged quantity of the toner present on its surface at a high level before the toner contacts the photosensitive member.

The dielectric loss tangent which is one of the electrical characteristics of the electroconductive rubber roller means an index indicating the flowability of electricity (conductivity) and the degree of influence of a capacitor component (electrostatic capacity). In other words, the dielectric loss tangent is a parameter indicating a phase delay when an alternating current is applied to the development roller, namely, the rate of the capacitor component (electrostatic capacity) when a voltage is applied to the development roller. That is, the dielectric loss tangent is indicated by a charged quantity of the toner generated when the toner contacts the development roller through a regulation blade at a high voltage and by a charged quantity thereof which escapes to he development roller before the toner is transported to the photosensitive member. Therefore, the dielectric loss tangent is an index indicating the charged quantity of the toner immediately before the toner contacts the photosensitive member. When the dielectric loss tangent is large, it is easy to energize (electric charge) the electroconductive rubber roller, which makes the progress of polarization slow. On the other hand, when the dielectric loss tangent is small, it is not easy to energize the electroconductive rubber roller, which makes the progress of polarization fast. By setting the dielectric loss tangent to the above-described range, the polarization of the electroconductive rubber roller can be set to an optimum range. Thus it is possible to impart electrostatic property to the toner without preventing the electric resistance from becoming nonuniform and maintain the electrostatic property imparted thereto.

Therefore the electroconductive rubber roller can be preferably used as the development roller for making the toner adhere to the photosensitive member of an image-forming mechanism of an electrophotographic apparatus. The electroconductive rubber roller can be suitably used as the development roller for single-component toner.

The reason the dielectric loss tangent is set to the range of 0.1 to 1.5 is because it is difficult to make the dielectric loss tangent less than 0.1 by ionic conduction. If the dielectric loss tangent is more than 1.5, it is impossible to provide the development roller with the above-described preferable charging characteristic.

The oxide film is formed on the surface of the rubber layer. Thus it is possible to adjust the dielectric loss tangent of the rubber layer whose surface is formed of the oxide film having a large number of C═O radicals and C—O radicals. The surface roughness of the rubber layer is favorably not more than 8 μm and more favorably not more than 5 μm. The oxide film can be formed on the surface of the rubber layer by irradiating the surface thereof with ultraviolet rays and/or ozone and oxidizing the rubber layer. The surface of the rubber layer is irradiated with ultraviolet rays having a wavelength of favorably 100 nm to 400 nm and more favorably 100 nm to 200 nm for 3 to 30 minutes, although the wavelength varies according to the distance between the surface of the rubber layer and an ultraviolet ray irradiation lamp and the kind of rubber. It is possible to reduce the dielectric loss tangent efficiently by forming the surface of the oxide film, when the rubber composition contains calcium carbonate treated with fatty acid.

The present inventors have found that when the rubber composition contains the ionic-conductive rubber as its main component and one or a plurality of calcium carbonates treated with fatty acid and/or weak electroconductive carbon black, the rubber layer is capable of realizing a very low dielectric loss tangent without deteriorating the ionic conductivity of the rubber composition unlike the conventional rubber composition containing the ionic-conductive rubber. As the dielectric loss tangent-adjusting filler, it is possible to use clay, organic/inorganic pigments.

The weak electroconductive carbon black has large-diameter particles whose structure has a low extent of development in their structure and has a small degree of contribution to the electroconductivity of the rubber composition. The rubber composition containing the weak electroconductive carbon black is capable of obtaining an operation similar to the operation of a capacitor owing to a polarizing action without increasing the electroconductivity thereof and controlling the electrostatic property thereof without preventing the electric resistance thereof from becoming nonuniform. Various weak electroconductive carbon blacks can be selected. For example, it is favorable to use carbon black produced by a furnace method or a thermal method providing particles having large diameters. Above all, it is most favorable to use carbon black produced by the thermal method because the thermal method produces carbon black containing little impurities. SRF carbon, FT carbon, and MT carbon are preferable in terms of classification of carbon. The average diameter of the carbon black is favorably in the range of 40 nm to 200 nm and more favorably in the range of 50 nm to 150 nm. The carbon black used for pigment may be used.

In the case where fatty acid is present on the interface of the calcium carbonate treated therewith, the calcium carbonate is more active than ordinary calcium carbonate and is lubricant, it can be dispersed easily and reliably. Owing to the dispersion action and the polarization action accelerated by the treatment of the calcium carbonate with the fatty acid, there is an increase in the operation of the rubber layer similar to that of the capacitor. Thus the dielectric loss tangent can be efficiently reduced.

Preferably, supposing that an electric resistance of the electroconductive rubber roller is R100 when a voltage of 100V is applied thereto and is R500 when a voltage of 500V is applied thereto, the following relationship establishes:

$$\log R100 - \log R500 < 0.5$$

By specifying the difference between the reference electric resistance value of the rubber roller when the voltage of 500V close to a developing bias is applied thereto and the electric resistance value thereof when the voltage of 100V is applied thereto as described above, it is possible to make the electrical characteristic thereof such as the electric resistance uniform. It is favorable that the rubber layer is ionic-conductive because the ionic-conductive rubber layer depends on a voltage to a low extent. In the case where the electric resistance is dependent on electronic conduction, the value of (log R100−log R500) is not less than 1.

It is favorable that not less than 5 nor more than 70 parts by weight of the weak electroconductive carbon black is added to 100 parts by weight of the rubber component contained in the rubber composition. It is possible to reduce the dielectric loss tangent while maintaining an ionic-conductive state by setting the amount of the weak electroconductive carbon black to the above-described range, although a proper amount of the weak electroconductive carbon black varies in dependence on the kind thereof. It is more favorable to mix not less than 10 parts by weight of the weak electroconductive carbon black with 100 parts by weight of the rubber component and most favorable to mix not less than 20 parts by weight the weak electroconductive carbon black with 100 parts by weight of the rubber component to reduce the dielectric loss tangent effectively. For example, in the case of the carbon black produced by the furnace method, it is preferable to mix not less than 20 nor more than 60 parts by weight of the weak electroconductive carbon black with 100 parts by weight of the rubber component.

It is favorable that not less than 30 nor more than 80 parts by weight of the calcium carbonate treated with the fatty acid is added to 100 parts by weight of the rubber component contained in the rubber composition. If less than 30 parts by weight of the calcium carbonate treated with the fatty acid is added to 100 parts by weight of the rubber component, the degree of influence on the dielectric loss tangent is low. Thus, it is difficult to reduce the dielectric loss tangent. On the other hand, if more than 80 parts by weight of the calcium carbonate treated with the fatty acid is added to 100 parts by weight of the rubber component, it is possible to control the dielectric loss tangent. But the hardness of the rubber composition is liable to increase and the resistance is liable to fluctuate. It is more favorable that not less than 40 nor more than 70 parts by weight of the calcium carbonate treated with the fatty acid is added to 100 parts by weight of the rubber component.

The resistance of the electroconductive rubber roller is favorably in the range of $10^4\Omega$ to $10^8\Omega$ and more favorably in the range of $10^4\Omega$ to $10^7\Omega$ when a voltage of 500V is applied thereto. If the electric resistance thereof is smaller than $10^4\Omega$, too much electric current flows and hence a defective image is liable to be formed. Further there is a possibility of discharge to the photosensitive member. On the other hand, if the electric resistance thereof is larger than $10^8\Omega$, toner is inefficiently supplied to the photosensitive member and thus the development roller is unsuitable for practical use. Further when the toner is transferred to the photosensitive member, the development roller has a voltage drop, which prevents reliable transport of the toner from the development roller to the photosensitive member. Consequently a defective image is formed.

Supposing that the electric resistance of the electroconductive rubber roller is R50 when a voltage of 50V is applied thereto before the oxide film is formed on the surface of the rubber layer and is R50a when a voltage of 50V is applied thereto after the oxide film is formed thereon, it is favorable that log R50a−log R50=0.2 to 1.5. If log R50a−log R50 is smaller than 0.2, it is difficult to provide the rubber roller with a low friction coefficient and improve the durability thereof. On the other hand, if log R50a−log R50 is larger than 1.5, the change of the electric resistance of the rubber roller is large during the use thereof and thus preferable charging characteristic cannot be obtained. The electric resistance of the electroconductive rubber roller at the time when a low voltage of 50V can be stably applied thereto is set as the index value. Thus it is possible to accurately suppress a slight rise of the electric resistance owing to the formation of the oxide film. It is more favorable that log R50a−log R50=0.5 to 1.2.

Ionic-conductive rubbers such as unsaturated rubbers and thermoplastic rubbers can be used as the rubber component of the rubber layer. These rubbers can be used in various forms, for example, as a copolimerized rubber, a blend rubber, and the like. More specifically, it is possible to use epihalohydrin rubber (especially, epichlorohidrin rubber), urethane rubber, acrylonitrile-butadiene rubber, chloroprene rubber, butadiene rubber, styrene-butadiene rubber, butyl rubber, fluororubber, isoprene rubber, and silicone rubber. These rubbers can be used singly or in combination.

The oxide film can be preferably formed by adding 20 to 100 parts by weight of epichlorohidrin rubber which is halogen-containing rubber to the entire rubber component. As the epichlorohidrin rubber, the following various epichlorohidrin polymers can be used: homopolimerized rubber of epichlorohidrin (EP), epichlorohidrin-ethylene oxide (EO) copolymer, epichlorohidrin-propylene oxide (PO) copolymer, epichlorohidrin-allyl glycidyl ether (AGE) copolymer, epichlorohidrin-ethylene oxide-allyl glycidyl ether copolymer, epichlorohidrin-propylene oxide-allyl glycidyl ether copolymer, and epichlorohidrin-ethylene oxide-propylene oxide-allyl glycidyl ether copolymer.

When the halogen-containing rubber is used, it is preferable to add not less than 0.5 wt % nor more than 5.0 wt % of an acid acceptor for the above-described wt % of the halogen-containing rubber. If less than 0.5 wt % of the acid acceptor is added to the above-described wt % of the halogen-containing rubber, it is difficult for the acid acceptor to display the effect of preventing inhibition in vulcanization and contamination of the photosensitive member. On the other hand, if more than 5.0 wt % of the acid acceptor is added to the above-described wt % of the halogen-containing rubber, the hardness of the rubber layer is liable to increase. As the acid acceptor, hydrotalcites and magsarat are preferable because they have preferable dispersibility. As the acid acceptor, it is also possible to use various substances acting as acid-receiving substances.

Not more than 5 parts by weight of a plasticizing component can be added to 100 parts by weight of the rubber component of the rubber layer. Thereby the oxide film can be formed preferably. If more than 5 parts by weight of the plasticizing component is added to 100 parts by weight of the rubber component, bleed is liable to occur in forming the oxide film and the photosensitive member is liable to be contaminated when the rubber roller is mounted on a printer or the printer is in operation. As the plasticizing component, it is possible to use fatty acids such as stearic acid which is used as processing aid; plasticizers such as dibutyl phthalate (DBP), dioctyl phthalate(DOP), and tricresyl phosphate; and ionic-conductive agents such as quaternary ammonium salts.

It is preferable that the rubber composition contains powdered sulfur as a vulcanizing agent because the powdered sulfur contributes to realization of a low electric resistance. Other than sulfur and a sulfur-containing organic agent, peroxides can be used. As the sulfur-containing organic agent, it is possible to use tetramethylthiuram disulfide, N,N-dithiobismorpholine, and the like. As the peroxides, it is possible to use benzoyl peroxide and the like. The vulcanizing agent is used at favorably not less than 0.5 nor more than 5 parts by weight and at more favorably not less than 1 nor more than 3 parts by weight for 100 parts by weight of the rubber component.

Besides the sulfur, it is possible to use triazine derivatives, thioureas, monomers singly or in combination. Epichlorohidrin rubber vulcanized with the sulfur and the thioureas allows the rubber layer to have a compression set not more than 15%, which allows the rubber layer to have preferable durability, high accuracy to be obtained in polishing process, and the oxide film to be formed efficiently with ultraviolet rays.

More specifically, the thioureas are used at favorably not less than 0.2 parts by weight nor more than 3 parts by weight and at more favorably not less than 1 parts by weight nor more than 2 parts by weight for 100 parts by weight of the rubber component. As the thioureas, it is possible to use tetramethylthiourea, trimethylthiourea, ethylenethiourea, and thioureas shown by $(C_nH_{2n+1}NH)_2C{=}S$ (n=integers of 1 to 10) singly or in combination.

It is possible to add a proper amount of age resistors to the rubber component to prevent deterioration of the rubber layer so long as they do not adversely affect the formation of the oxide film.

The thickness of the rubber layer is favorably in the range of 0.5 mm to 10 mm and more favorably in the range of 1 mm to 7 mm. If the thickness of the rubber layer is less than 0.5 mm, it is difficult to obtain a proper nip between rubber rollers. If the thickness of the rubber layer is more than 10 mm, i.e., it is difficult to make the rubber roller compact.

The electroconductive rubber roller may have one rubber layer on the periphery of the core metal or two or three layers on the periphery of the outermost rubber layer to adjust the electric resistance thereof. In dependence on demanded performance, it is possible to appropriately set mixing ratio among components of the rubber composition of each layer, the disposing order of layers other than the outermost rubber layer, and an entire thickness thereof. In addition to the development roller, the electroconductive rubber roller of the present invention can be used as an electroconductive roller such as a charging roller and a transfer roller which are used in a printer, a copying apparatus, and the like. The core metal can be made of metal such as aluminum, aluminum alloy, SUS, iron, and the like; and ceramics.

DETAILED DESCRIPTION OF THE PREFERRED EMBODIMENTS

The embodiments of the present invention will be described below with reference to the drawings.

Figure 1:
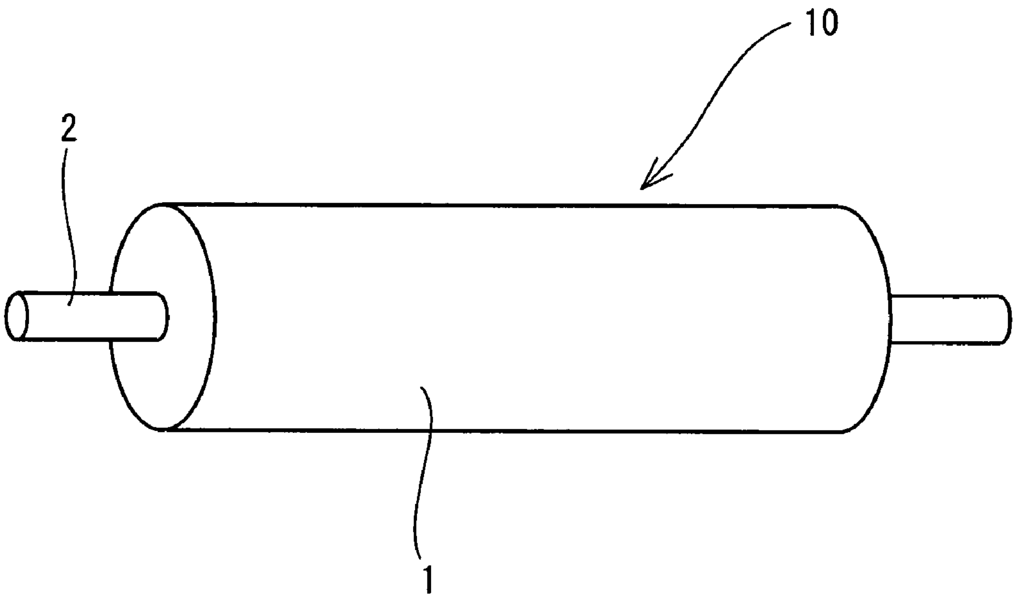
FIG. 1 is a schematic view showing an electroconductive rubber roller of the present invention.

As shown in FIG. 1, an electroconductive rubber roller 10 has a cylindrical rubber layer 1 having a thickness of 12 mm and a columnar metal core (shaft) 2 inserted into a hollow portion of the rubber layer 1. The rubber layer 1 and the core metal 2 are bonded to each other with an adhesive agent. The surface of the rubber layer 1 is oxidized with ultraviolet rays to form the surface as an oxide film.

The rubber layer 1 is made of a rubber composition containing an ionic-conductive rubber as its main component. More specifically, the rubber component contains 100 parts by weight of epichlorohidrin rubber (ethylene oxide (EO), epichlorohidrin (EP), and allyl glycidyl ether (AGE) are copolymerized at 56 mol %, 40 mol %, and 4 mol % respectively) and 3 parts by weight of an acid acceptor consisting of hydrosulfite.

The rubber composition contains 10 parts by weight of weak electroconductive carbon black dispersed therein as a dielectric loss tangent-adjusting filler. The rubber composition further contains 0.7 parts by weight of powdered sulfur as a vulcanizing agent and 1.0 part by weight of a vulcanizing accelerator (ethylenethiourea). Carbon black whose particle has a diameter of 122 nm is used the weak electroconductive carbon black.

After the rubber composition is kneaded, it is preformed by extruding it cylindrically by an extruder. The extruded rubber composition is cut to a predetermined size to obtain a preform. Thereafter the preform is supplied to a vulcanizing can to vulcanize it at a temperature at which the rubber component is crosslinked. Thereafter the core metal is inserted into the cylindrical rubber layer to obtain a rubber roller.

The oxide film is formed by the following method:

The surface of the rubber roller is polished by a cylindrical polishing machine to a mirror-like surface finish to set the surface roughness of the rubber roller to Rmax of 14.5 μm (Rz: 6.3 μm). After the surface of the rubber roller is washed with water, an ultraviolet ray irradiator irradiates the surface of the roller with ultraviolet rays (184.9 nm) to form the oxidized film. The rubber roller is irradiated with ultraviolet rays at an angle of 90 degrees in the circumferential direction thereof for five minutes. The rubber roller was rotated at 90 degrees four times to form an oxide film on the entire peripheral surface thereof.

Supposing that the electric resistance R50 of the roller is $10^6\Omega$, when a voltage of 50V is applied to the roller before forming the oxide film and is $10^{6.8}\Omega$, when the voltage of 50V is applied to the roller after forming the oxide film, log R50a−log R50=0.8

Supposing that the electric resistance of the electroconductive rubber roller is R100 when a voltage of 100V is applied thereto and is R500 when a voltage of 500V is applied thereto, the value of (log R100−log R500) is 0.2. The rubber layer is ionic-conductive. The dielectric loss tangent of the electroconductive rubber roller 10 is 1.45.

Since the rubber layer is ionic-conductive and the dielectric loss tangent of the electroconductive rubber roller 10 is small, namely, 1.45, it is possible to make the electric resistance of the electroconductive rubber roller uniform and control the electrostatic property of toner. Thus the electroconductive rubber roller is allowed to have preferable charging characteristic. Therefore the electroconductive rubber roller keeps preferable charging characteristic for a long time and is particularly suitable for the development roller which supplies single-component toner to an electrostatic latent image formed on the photosensitive member.

The rubber composition may contain calcium carbonate treated with fatty acid as the dielectric loss tangent-adjusting filler. The weak electroconductive carbon black may be used in combination with the calcium carbonate treated with the fatty acid. The entire surface of particles of the calcium carbonate should be coated with the fatty acid such as stearic acid. It is possible to use ionic-conductive rubbers such as a polar rubber as the rubber component. In addition, it is possible to use an appropriate amount of various additives as necessary. In the electroconductive rubber roller, two or three layers for adjusting the electric resistance thereof may be disposed on the peripheral surface of the core metal thereof.

The electroconductive rubber roller of each of the examples and comparison examples was formed as follows: components shown in table 1 and described below were kneaded by a Banbury mixer. Thereafter the kneaded components were extruded by an extruder to obtain a tube having an outer diameter of ϕ 22 mm and an inner diameter of ϕ 9.5 mm. The tube was mounted on a shaft used in vulcanizing the rubber component. After the rubber component was vulcanized by a vulcanizing can at 160° C. for one hour, the tube was mounted on a shaft, having a diameter of ϕ 10 mm, to which an electroconductive adhesive agent was applied. The tube and the shaft were bonded to each other in an oven having a temperature of 160° C. After the end of each of the obtained rubber roller was molded, the surface thereof was polished by a cylindrical polishing machine to a mirror-like surface finish by traverse polishing and finish polishing so that each rubber roller had a predetermined surface roughness at ϕ 20 mm (tolerance: 0.05). Rz was set to 3 to 5 μm. After the surface of each rubber roller was washed with water, a voltage of 50V was applied to each rubber roller to measure the electric resistance R50 thereof.

An ultraviolet ray irradiator (produced by Sen Tokushu Kogen Kabushiki Kaisha, PL21-200) irradiated the surface of each rubber roller with ultraviolet rays (184.9 nm) to form the outermost layer. The rubber roller was irradiated with ultraviolet rays at an angle of 90 degrees in the circumferential direction thereof for a predetermined period of time. The rubber roller was rotated at 90 degrees four times to form the oxide film on the entire peripheral surface (360 degrees) thereof. The irradiation period of times shown in table 1 is the period of time spent to irradiate ¼ (90 degrees) of the entire peripheral area of the rubber roller. After the oxide film was formed, the electric resistance R50a of each rubber roller was measured when a voltage of 50V was applied thereto by a method that is described later. The electric resistance thereof was also measured when a voltage of 100V and a voltage of 500V were applied thereto.

TABLE 1-1

| | | Example 1 | Example 2 | Example 3 | Example 4 |
|---|---|---|---|---|---|
| Epichlorohidrin rubber | CG102 produced by Daiso | 100 | 100 | 100 | 100 |
| Calcium carbonate | Light calcium carbonate produced by Shiraishi Calcium | | | | |
| Calcium carbonate | Super S produced by Maruo calcium | | | | |
| Ultra-fine particle size calcium carbonate treated with fatty acid | Hakuenka CC produced by Shiraishi Calcium | | 60 | | 30 |
| Electroconductive carbon black | Denka black produced by Electrochemical | | | | |
| (weak electroconductive) carbon black | Asahi #15 produced by Asahi Carbon (Special Grade) | 10 | | 40 | 10 |
| Electric resistance of roller (logR500V) | | 5.9 | 6 | 5.8 | 5.9 |
| Electric resistance of roller (logR100V) | | 6.1 | 6.3 | 6 | 6.1 |
| Dielectric loss tangent | | 1.45 | 0.50 | 0.95 | 1.00 |
| Method of forming oxide film | | Irradiated with ultraviolet ray 5 minutes | Irradiated with ultraviolet ray 5 minutes | Irradiated with ultraviolet ray 5 minutes | Irradiated with ultraviolet ray 5 minutes |
| Electroconductivity | | Ion | Ion | Ion | Ion |
| Charged quantity (μc/g) | | 18.0 | 27.0 | 27.5 | 21.7 |
| Evaluation of formed image | | Good | Excellent | Excellent | Good |
| Change of concentration owing to rotation of development roller | | Small | Did not occur | Did not occur | Small |
| | Evaluation | ○ | ◎ | ◎ | ○ |

TABLE 1-2

| | | Comparison Example 1 | Comparison Example 2 | Comparison Example 3 |
|---|---|---|---|---|
| Epichlorohidrin rubber | CG102 produced by Daiso | 100 | 100 | 100 |
| Calcium carbonate | Light calcium carbonate produced by Shiraishi Calcium | 40 | | |
| Calcium carbonate | Super S produced by Maruo calcium | | 75 | |
| Ultra-fine particle size calcium carbonate treated with fatty acid | Hakuenka Ccproduced by Shiraishi Calcium | | | |
| Electroconductive carbon black | Denka black produced by Electrochemical | | | 20 |
| (weak electroconductive) carbon black | Asahi #15 produced by Asahi Carbon (Special Grade) | | | |
| Electric resistance of roller (logR500V) | | 5.9 | 6.1 | not more than 5.0 |
| Electric resistance of roller (logR100V) | | 6.1 | 6 | 5.5 |
| Dielectric loss tangent | | 1.80 | 1.70 | 0.48 |

TABLE 1-2-continued

| | Comparison Example 1 | Comparison Example 2 | Comparison Example 3 |
|---|---|---|---|
| Method of forming oxide film | Irradiated with ultra-violet ray 5 minutes | Not irradiated with ultra-violet ray | Irradiated with ultra-violet ray 5 minutes |
| Electroconductivity | Ion | Ion | Carbon |
| Charged quantity (μc/g) | 13.0 | 15.0 | 22.6 |
| Evaluation of formed image | Bad | | Uneven concentration |
| Change of concentration owing to rotation of development roller | Large | Medium | Small (Entirely uneven) |
| Evaluation | Δ~X | Δ | X |

Rubber layer (used by parts by weight shown in table 1)

Produced by Daiso Kabushiki Kaisha: Epichlorohidrin rubber (GECO) Epichlomer CG102 (ethylene oxide (EO), epichlorohidrin (EP), allyl glycidyl ether (AGE) were copolymerized at 56 mol %, 40 mol %, and 4 mol % respectively)

Carbon black: The carbon blacks shown in table 1 were used in the amount shown therein.

Calcium carbonate: Calcium carbonates shown in table 1 were used in the amount shown therein.

Vulcanizing Agent

Powdered sulfur: 0.5 parts by weight for the entire rubber component

Vulcanizing accelerator: 1.4 parts by weight of Accel 22-S (ethylenethiourea) produced by Kawaguchi Kagaku for the entire rubber component.

Other additives

Acid acceptor: Three wt % of hydrotalcite (DHT-4A-2) for epichlorohidrin rubber (GECO)

EXAMPLES 1 THROUGH 4

In the electroconductive rubber roller of each of the examples 1 through 4, the rubber component consisted of 100 parts by weight of the epichlorohidrin rubber. In the electroconductive rubber roller of each of the examples 1, 3, and 4, the weak electroconductive carbon black was added to the rubber component as the dielectric loss tangent-adjusting filler. In the electroconductive rubber roller of the example 2, the calcium carbonate treated with the fatty acid was used as the dielectric loss tangent-adjusting filler. The oxide film was formed on the rubber layer of the electroconductive rubber roller of the examples 1 through 4 in the conditions shown in table 1.

COMPARISON EXAMPLES 1 THROUGH 3

As shown in table 1, electroconductive carbon black was used as the filler in the electroconductive rubber roller of the example 3. Calcium carbonate not treated with the fatty acid was used for the electroconductive rubber roller of the comparison examples 1 and 2. The oxide film was not formed on the rubber layer of the electroconductive rubber roller of the comparison example 2. In other points, the electroconductive rubber roller of each of the comparison examples 1 through 3 had the same specification as that of the example 1.

The following characteristics were measured on the electroconductive rubber roller of the examples and the comparison examples prepared as described above. Table 1 shows the results.

Measurement of Electric Resistance of Roller

Figure 2:
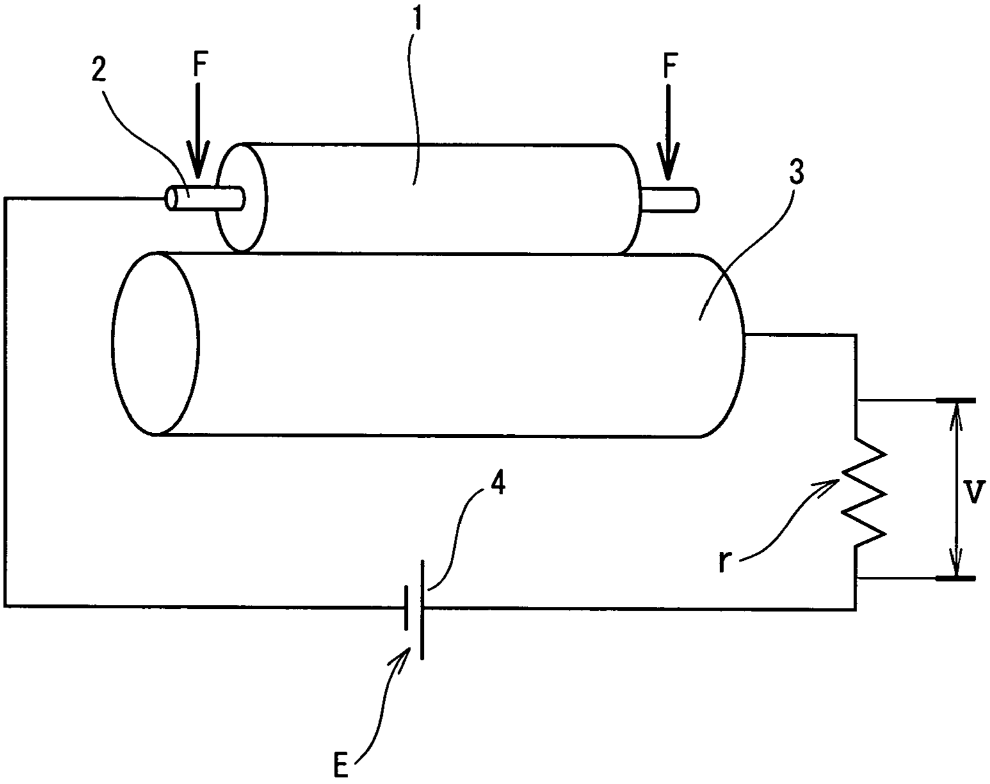
FIG. 2 shows a method of measuring the electric resistance of the electroconductive rubber roller.

As shown in FIG. 2, the rubber layer 1 through which the core metal 2 was inserted was mounted on an aluminum drum 3, with the rubber layer 1 in contact with the aluminum drum 3. The leading end of a conductor, having an internal electric resistance of r (100Ω), connected to the positive side of a power source 4 was connected to one end surface of the aluminum drum 3. The leading end of the conductor connected to the negative side of the power source 4 was connected to one end surface of the electroconductive rubber roller 10.

A voltage applied to the internal electric resistance r of the conductor was detected. The detected voltage was V.

Supposing that a voltage applied to the apparatus is E, the electric resistance R of the rubber roller 10 is: $R=r\times E/(V-r)$. Because the term of (−r) is regarded as being slight, $R=r\times E/V$.

A load F of 500 g was applied to both ends of the core metal 2. The roller rotated at 30 rpm. The applied voltage E was the above-described voltage (50V, 100V, 500V). The detected voltage V was measured at 100 times during four seconds. The electric resistance R was computed by using the above equation. The measurement was conducted at a constant temperature of 23° C. and a constant humidity of 55%.

Table 1 shows whether the rubber layer was ionic-conductive or electroconductive (carbon black).

Printing Test

To examine adhesiveness of charged toner, electric uniformity of the charged toner, time stability (durability), i.e., to evaluate the performance of the rubber roller of each of the examples and the comparison examples, they were mounted on a laser printer (HL1440 produced by Brother Industries, Inc.) commercially available to check formed images.

The quality of each image (initial image) was evaluated by the degree of unevenness of concentration thereof, when a 5% halftone image was formed on 50 sheets of paper. The degree of the change of the concentration of the image that was made owing to the rotation of each rubber roller was also evaluated.

At that time, the charged quantity was measured by suction of toner to set the measured charged quantity as the parameter. More specifically, after 25% halftone printing was conducted, toner disposed proximate to a photosensitive member was sucked by a charged quantity measuring apparatus to measure the charged quantity and the weight of the sucked toner by a weight meter. The quantity of static electricity per weight was computed as the charged quantity (μC/g). The area of the sucked toner present on the development roller was measured to compute the transported amount of the toner as follows:

Transported amount of toner=weight of sucked toner/area of sucked toner

Measurement of Dielectric Loss Tangent

Figure 3:
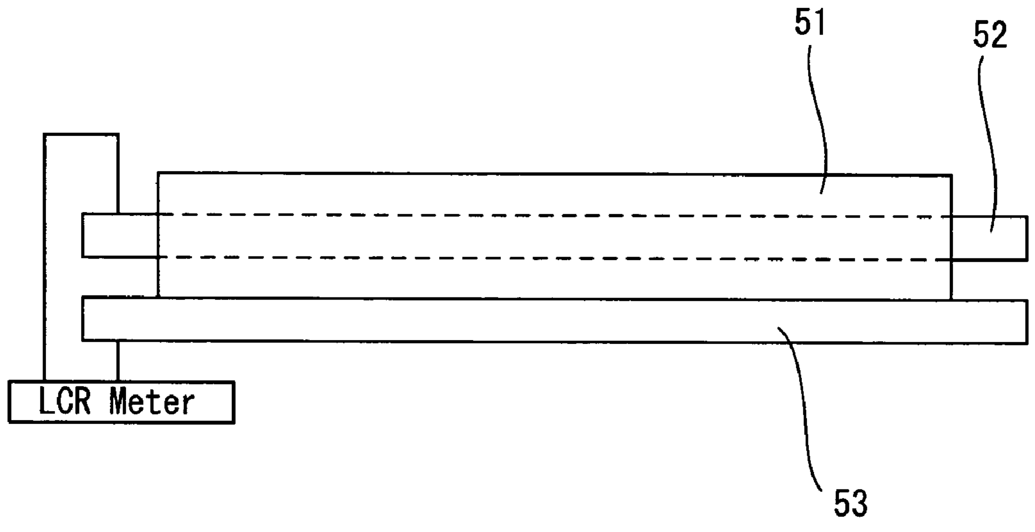
FIG. 3 shows a method of measuring a dielectric loss tangent.

As shown in FIG. 3, an alternating voltage of 100 Hz to 100 kHz was applied to electrodes, namely, a shaft 52 and a metal plate 53 on which a rubber roll 51 was placed. An R (electric resistance) component and a C (condencer) component were measured separately at a temperature of 23° C. to 24° C. (room temperature). The dielectric loss tangent, the impedance, and the phase angle were found by using the following equation.

$$\text{Dielectric loss tangent } (\tan \delta)=G/\omega C$$

$$G=1/R$$

The dielectric loss tangent is found as G/ω by modeling the electrical characteristic of one roller as a parallel equivalent circuit of the electric resistance component thereof and that of the capacitor component.

As shown in table 1, the dielectric loss tangent of the rubber roller of each of the examples 1 through 4 were very small, namely, in the range of 0.50 to 1.45. Further since the rubber rollers were ionic-conductive, the rubber rollers did not have problems in the evaluation and had a large charged quantity. It was confirmed that the rubber rollers can be practically used as preferable development rollers because they have superior charging characteristic.

The rubber roller of the comparison example 1 using ordinary calcium carbonate as the filler had a large dielectric loss tangent. Thus a formed image was evaluated as bad. The image had a large concentration change. The rubber roller had a small charged quantity. Thus the evaluation of the rubber roller was that it cannot be practically used as a development roller.

The rubber layer of the rubber roller of the comparison example 2 contained the ordinary calcium carbonate as the filler and did not have the oxide film formed on the rubber layer. Thus the rubber roller of the comparison example 2 had a large dielectric loss tangent. Therefore the roller did not have problems in the evaluation of the formed image. However, the image had a concentration change, although the degree of the concentration change was not high. The rubber roller had a small charged quantity.

The rubber layer of the rubber roller of the comparison example 3 contained the electroconductive carbon black as the filler. Thus the rubber roller had a small dielectric loss tangent of 0.48. The rubber roller was not ionic-electroconductive but was electroconductive, namely, dependent on carbon black. Thus although the rubber roller had a large charged quantity, there was a high degree of unevenness in the concentration of the image.

As described above, according to the present invention, the rubber layer of the electroconductive rubber roller is made of the ionic-conductive rubber depending on ions and contains the weak electroconductive carbon black or the calcium carbonate treated with the fatty acid as the dielectric loss tangent-adjusting filler to reduce the dielectric loss tangent of the rubber roller to the above-described range. Thus it is possible to make the electric resistance of the rubber roller uniform and control the electrostatic property of the toner. Thereby the rubber roller is allowed to show preferable charging characteristic. Thus when the electroconductive rubber roller is used as the development roller, the development roller is capable of keeping the charged quantity of the toner present on its surface at a high level before the toner contacts the photosensitive member.

The oxide film is formed on the surface of the rubber roller. Thus it is possible to adjust the dielectric loss tangent of the rubber layer. It is possible to reduce the dielectric loss tangent efficiently by forming the oxide film on the surface of the rubber layer, when the rubber composition contains the calcium carbonate treated with the fatty acid. Thus the rubber roller is allowed to have uniform electric resistance and obtain preferable charging characteristic.

Therefore the electroconductive rubber roller of the present invention can be suitably used for an image-forming mechanism of an electrophotographic apparatus of office appliances such as a laser beam printer, an ink jet printer, a copying apparatus, a facsimile, an ATM, and the like. More specifically, the electroconductive rubber roller can be suitably used as the development roller for making toner adhere to a photosensitive member of the image-forming mechanism of the electrophotographic apparatus. The electroconductive rubber roller can be most suitably used as the development roller used for single-component toner. The electroconductive rubber roller can be used as the development roller of both a contact type that contacts the photosensitive member and non-contact type. In addition, the electroconductive rubber roller can be used as a charging roller for uniformly charging the photosensitive member, a transfer roller for transferring a toner image to paper from the photosensitive member, a toner supply roller for transporting toner, a driving roller for driving a transfer belt from the inner side thereof.

What is claimed is:

1. An electroconductive rubber roller having an outermost rubber layer made of a rubber composition containing an ionic-conductive rubber as a main component thereof, wherein the surface of said outermost rubber layer comprises an oxide film formed by oxidation of the outermost rubber layer by irradiating with ultraviolet rays and/or ozone; and said rubber composition contains a dielectric loss tangent-adjusting filler to set a dielectric loss tangent of said electroconductive rubber roller to 0.1 to 1.5.

2. The electroconductive rubber roller according to claim 1, wherein a weak electroconductive carbon black having an average diameter of 40 nm to 200 nm and/or a calcium carbonate treated with a fatty acid are used as said dielectric loss tangent-adjusting filler.

3. The electroconductive rubber roller according to claim 1, wherein supposing that an electric resistance of said electroconductive rubber roller is R100 when a voltage of 100V is applied thereto and is R500 when a voltage of 500V is applied thereto, the following relationship establishes:

$$\log R100-\log R500<0.5.$$

4. The electroconductive rubber roller according to claim 2, wherein supposing that an electric resistance of said electroconductive rubber roller is R100 when a voltage of 100V is applied thereto and is R500 when a voltage of 500V is applied thereto, the following relationship establishes:

$$\log R100-\log R500<0.5.$$

5. The electroconductive rubber roller according to claim 1, wherein not less than 5 nor more than 70 parts by weight of weak electroconductive carbon black is added to 100 parts by weight of said rubber component contained in said rubber composition.

6. The electroconductive rubber roller according to claim 2, wherein not less than 5 nor more than 70 parts by weight of said weak electroconductive carbon black is added to 100 parts by weight of said rubber component contained in said rubber composition.

7. The electroconductive rubber roller according to claim 3, wherein not less than 5 nor more than 70 parts by weight of weak electroconductive carbon black is added to 100 parts by weight of said rubber component contained in said rubber composition.

8. The electroconductive rubber roller according to claim 4, wherein not less than 5 nor more than 70 parts by weight of said weak electroconductive carbon black is added to 100 parts by weight of said rubber component contained in said rubber composition.

9. The electroconductive rubber roller according to claim 1, wherein not less than 30 nor more than 80 parts by weight of a calcium carbonate treated with a fatty acid is added to 100 parts by weight of said rubber component contained in said rubber composition.

10. The electroconductive rubber roller according to claim 2, wherein not less than 30 nor more than 80 parts by weight of said calcium carbonate treated with said fatty acid is added to 100 parts by weight of said rubber component contained in said rubber composition.

11. The electroconductive rubber roller according to claim 3, wherein not less than 30 nor more than 80 parts by weight of a calcium carbonate treated with a fatty acid is added to 100 parts by weight of said rubber component contained in said rubber composition.

12. The electroconductive rubber roller according to claim 4, wherein not less than 30 nor more than 80 parts by weight of said calcium carbonate treated with said fatty acid is added to 100 parts by weight of said rubber component contained in said rubber composition.

13. The electroconductive rubber roller, according to claim 1, which is used as a development roller for making toner adhere to a photosensitive member of an image-forming mechanism of an electrophotographic apparatus.

14. The electroconductive rubber roller, according to claim 2, which is used as a development roller for making toner adhere to a photosensitive member of an image-forming mechanism of an electrophotographic apparatus.

15. The electroconductive rubber roller, according to claim 3, which is used as a development roller for making toner adhere to a photosensitive member of an image-forming mechanism of an electrophotographic apparatus.

16. The electroconductive rubber roller, according to claim 4, which is used as a development roller for making toner adhere to a photosensitive member of an image-forming mechanism of an electrophotographic apparatus.

17. An electroconductive rubber roller which is used as a development roller used for single-component toner and having an outermost rubber layer made of a rubber composition containing an ionic-conductive rubber as a main component thereof, wherein said rubber layer has a thickness of 0.5 mm to 10 mm and a surface of said outermost rubber layer comprises an oxide film formed by oxidation of the outermost rubber; and said rubber composition contains a dielectric loss tangent-adjusting filler to set a dielectric loss tangent of said electroconductive rubber roller to 0.1 to 1.5.

* * * * *